United States Patent Office

2,888,396
Patented May 26, 1959

2,888,396

PROCESS FOR UPGRADING HYDROCARBONS

Rhea N. Watts, St. Francisville, La., assignor to Esso Research and Engineering Company, a corporation of Delaware No Drawing. Application April 13, 1955
Serial No. 501,173

2 Claims. (Cl. 208—136)

The present invention relates to an improved process for upgrading hydrocarbons and catalysts therefor. More particularly it relates to a process for upgrading petroleum fractions of the naphtha boiling range by contacting them at elevated temperatures with hydrogen active catalyst. It relates further to a process for hydroforming and/or hydrofining naphtha boiling range fractions by contacting them with an active molybdenum-containing catalyst in the presence of hydrogen. It relates also to an improved catalyst composition which is particularly suitable for the various processes named above.

It has been suggested previously that hydrocarbons of the naphtha or gasoline boiling range may be improved in octane number, in decreased sulfur content, and in other respects by contacting them with a molybdenum oxide catalyst under appropriate conditions. The catalyst preferred, and used to some extent in the prior art, consists of a suitable base, usually largely, or almost entirely, of alumina, on which a suitable proportion, 2–15% or so, of molybdenum oxide is supported. The base may contain small proportions of silica to maintain mechanical strength and resistance to attrition. However, since silica is an active cracking catalyst, and cracking is frequently undesirable in processes of the type under consideration, it is usually desirable to keep the silica content as low as is consistent with good mechanical strength.

The prior art has also suggested that certain types of alumina are advantageous as catalyst supports. In particular, a highly pure alumina obtained by hydrolysis of an aluminum alcoholate and especially when prepared in the crystalline modification designated as eta alumina, is particularly desirable.

To summarize, the prior art has indicated that a small amount of silica is desirable for mechanical strength, although it is known to be undesirable for other reasons pointed out above. According to the present invention, it has been discovered that a catalyst consisting essentially of molybdenum oxide dispersed or supported on a base of either the pure alumina or the alumina plus silica type may be substantially improved by adding thereto small proportions of magnesium oxide and zinc oxide.

While the proportions of magnesium and zinc oxide to be added may be varied within limits of about 2–10% by weight of each, based on the total catalyst, it is preferred that these components be added in approximately the same molar proportions as the active catalystic component, namely, molybdenum oxide. Thus for a catalyst containing about 10% by weight of molybdena, particularly desirable proportions are about 6% by weight of zinc oxide and about 3% by weight of magnesium oxide.

Thus the improved composition of the present invention includes a base composed substantially entirely of alumina on which is supported about 5–15%, preferably 10%, by weight of molybdena. To this base is added about 2–4% by weight, preferably about 3%, of magnesium oxide and about 4–8% by weight, preferably about 6%, of zinc oxide.

To illustrate the invention further, a typical molybdenum oxide catalyst of the prior art type was prepared using a commercial base which comprised about 98% of alumina and 2% of silica. To this was added molybdenum oxide in sufficient proportions to constitute about 10% by weight of the composition.

A catalyst made according to the present invention had a composition of 78.4% alumina, 1.6% silica, 10% molybdena, 6.1% zinc oxide, and 3.0% magnesium oxide.

An important characteristic of molydena type catalysts is their resistance to conversion of the molybdenum oxide from an amorphous into the crystalline form. The amorphous or non-crystalline molydena is an active catalyst, but when it is converted by prolonged exposure to high temperature and other influences to the crystalline form which can be detected by X-ray analysis, its catalytic activity largely disappears.

A standard attrition test has been developed where catalyst is subjected to a high velocity air jet of constant velocity and other conditions held constant. The attrition rate per hour is determined by measuring the percentage by weight of catalyst which is reduced to particle sizes which are less than 20 microns in diameter. When the samples given in the examples above were tested, it was found that the attrition rate was 2% for the base catalyst and no greater, and in some cases markedly less, for the catalyst of the present invention.

The invention will be more clearly understood by referring to particular examples and test data.

EXAMPLE I

Equimolar proportions of $MoO_3$, MgO and ZnO were weighed out:

144 g. $MoO_3$
40.32 g. MgO
81.38 g. ZnO

The three oxides were first mixed dry, then distilled water was added until a thick paste was formed, as mixing was continued. The paste was then spread in a tray to a thickness of about ½ inch and allowed to stand until exothermic chemical reaction was complete. Temperature rose to 140° F., indicating a definite reaction. The mass was then dried in a steam oven at about 400° F. It has set up somewhat like a paste or cement. It was crushed and ground to a fine powder, less than about 10 microns particle size. Two hundred grams of the resulting powder were intimately mixed with 800 grams of a commercial alumina-silica catalyst base (98% alumina, 2% silica by weight) prepared by reacting together sodium aluminate, aluminum sulfate, and sodium silicate in an aqueous medium maintained at a pH of from about 9 to 10, followed by filtering the resultant precipitate, washing, and drying, preferably by spray drying to form spherical particles. The resulting mixture was pilled for test in a fixed bed hydroforming testing unit. Before testing, however, it was given a severe heat treatment, 24 hours at 1400° F. By chemical analysis it was found to contain 10.6 g. $MoO_3$.

For purposes of comparison, a 10% molybdena catalyst on the same base was similarly heated to 1400° F. Both were tested for hydroforming activity at 910° F., 200 p.s.i.g. pressure, using 0.7 mol percent of water and 2000 cubic feet of hydrogen (standard conditions) per barrel of feed (naphtha). Data are shown in Table I.

*Table I*

|  | Zn-Mg-Mo Cat. | Mo Cat. |
|---|---|---|
| Feed w./hr./w | 0.64 | 0.59 |
| Vol. Percent $C_5$+ | 82.6 | 87.0 |
| Vol. Percent $C_6$+ | 76.9 | 83.7 |
| Aniline Pt. $C_6$, °F | 28 | 46 |
| Est. Oct. No. $C_5$+ | 90 | 85 |

The new catalyst was thus shown to be substantially equal to the reference catalyst in activity, but was found also, upon further study, to be markedly superior in its maintenance of the molybdenum oxide in amorphous form. After heating both catalysts for 20 hours at 1400° F., a very severe test, it was found that 17% of the molybdenum oxide on the reference catalyst was converted to the inactive, crystalline $MoO_2$ form, whereas the new catalyst was not measurably changed in this respect. Heating was continued on both samples for a total of 42 hours on each and it was found that the catalyst in accordance with the present invention was still unchanged (no crystalline $MoO_2$ detectable by X-ray), whereas the reference catalyst had 40% of its molybdenum oxide converted to the inactive, crystalline form. This is considered a very remarkable result.

EXAMPLE II

A finely ground mole-per-mole composition of $MoO_3$, ZnO and MgO, prepared as in Example I, was added to an alumina-silica slurry before the conventional spray drying of the latter, to form fine spherical particles suitable for use in a fluid solids bed. Such a catalyst was tested, in comparison with the same reference catalyst (10% $MoO_3$ on the same base), at 200 p.s.i.g. and also at 50 p.s.i.g. in the hydroforming test unit. When quantities of 2.5 mole percent of water were used, the new catalyst was found to be superior. It was superior also to a prior art hydroforming catalyst of zincate-alumina spinel base.

In general, the proportion of crystalline $MoO_2$ increases with the age of the catalyst and therefore is a measure of its gradually decreasing activity. As with the catalyst of Example I, the new combination catalyst was found to be consistently superior in this respect.

It has also been found that some, but not all, of the advantages of this invention can be realized by adding magnesium oxide alone to the molybdena. This is not true of zinc oxide alone. The three components, however, are generally much superior to the molybdena magnesia combination. Equimolar proportions of the three components, reacted together before incorporation into the base, are preferred.

To demonstrate that zinc oxide alone is not effective, two catalysts were prepared using 4% and 5%, respectively, of zinc as ZnO. The first had a composition of 83.8% alumina, 1.9% silica, 9.5% molybdena, and 4.8% zinc oxide. The second had the same proportions except that alumina was 82.6% and zinc oxide was 6% by weight. After 20 hours at 1400° F., these materials had 5% and 11% respectively of crystalline $MoO_2$, being comparable to the reference molybdena catalyst and much inferior to the three-component catalyst of the present invention. After 42 hours at 1400° F., both samples showed 24% of the molybdena in crystalline form.

Another important characteristic, essential for fluid bed catalysts, is resistance to attrition. A standard test procedure, well known in the industry, involves blasting the catalyst with a high speed air jet of uniform velocity and measuring the fines produced. Particles smaller than 20 microns are first removed from the samples to be tested. Thereafter, the samples are subjected to the air blast and the 20-micron material produced is measured to determine attrition rate in percent fines produced per hour. The catalyst of Example II, those just described, and the reference catalyst were all subjected to this test. Incidentally, the use of a small amount of silica substantially improves alumina base catalysts in resistance to attrition. This is the reason that silica is commonly included as noted above.

The attrition tests showed that the reference catalyst had an attrition rate of 2%, the zinc-containing catalysts 1.5 and 2% respectively, and the catalyst of Example II 0.7%. The catalyst of Example I, which was made by mixing dry powders separately prepared, was, of course, not suitable for the attrition test. Data on the others are summarized in Table II.

Table II

| Test Number | 1 | 2 | 3 | 4 | 5 | 6 | 7 |
|---|---|---|---|---|---|---|---|
| Composition: Wt. percent | | | | | | | |
| $Al_2O_3$ | 88 | 88 | 78.4 | 78.4 | 83.8 | 82.6 | 78.4 |
| Silica | 2 | 2 | 1.6 | 1.6 | 1.9 | 1.9 | 1.6 |
| Molybdena | 10 | 10 | 10.0 | 10.0 | 9.5 | 9.5 | 10.9 |
| ZnO | | | 6.1 | 6.1 | 4.8 | 6.0 | 6.1 |
| MgO | | | 3.0 | 3.0 | | | 3.0 |
| Attrition, percent | 2 | 2 | (*) | (*) | 1.5 | 2.0 | 0.7 |
| Temp., °F | 1,400 | 1,400 | 1,400 | 1,400 | 1,400 | 1,400 | 1,400 |
| Hours heated | 20 | 42 | 20 | 42 | 42 | 42 | 42 |
| Percent Cryst. $MoO_2$ | 17 | 40 | 0 | 0 | 24 | 24 | 0 |

EXAMPLE III

The three-component catalyst may also be prepared by impregnating a standard 10% molybdena catalyst with aqueous solutions of suitable salts of zinc and magnesium. The acetates are very suitable for this purpose. Upon calcining they are converted to oxides. Catalyst prepared in this manner gave test results as recorded in test No. 7 of Table II above. The zinc catalysts of tests Nos. 5 and 6 in the same table also were prepared from the acetate. The material should be heated to at least 1100° F. and preferably higher, for a period of time sufficient to fully convert the acetates to oxides.

Recent studies have indicated that in some cases it is desirable to use a straight alumina base for hydroforming catalysts. A preferred base is that derived from aluminum alcoholates, preferably derived from water-insoluble alcohols as described in Kimberlin U.S.P. 2,636,865. According to the present invention, such catalysts also can be improved to some extent by incorporating zinc oxides and magnesium oxide along with the molybdena. As noted above, the zinc and magnesium oxides appear to counteract the tendency of silica, where present, to promote cracking. Where silica is not present, of course, they have no such function, but they do, in either case, appear effectively to inhibit the formation of crystalline molybdena. They appear also to improve resistance to attrition. It is evident, also, that these components appear to improve tolerance of the catalyst for water.

It will be understood that proportions of molybdena may vary somewhat, from about 5 to 15% by weight of total catalyst. The zinc oxide and magnesium oxide components should, for purposes of this invention, be at least approximately equimolar with the molybdenum oxide. In use, the naphtha to be converted, which may be a virgin or cracked naphtha of about 150°–430° F. boiling range or a narrow boiling cut from within this range, is contacted with the catalyst at elevated temperature and pressure, preferably 850°–1050° F., and at pressures of from about 50 to 500 p.s.i.g., and at a feed rate of naphtha between 0.25 and 1.0 w./hr./w. based on catalyst. Hydrogen or hydrogen-rich recycle gas is supplied to the reaction zone at a rate of from about 2000 to 8000 cubic feet per barrel of liquid naphtha feed. The operation may be either fixed bed, fluid bed, or moving bed, as is now well known in the art.

What is claimed is:

1. A process of hydroforming naphtha to produce high octane gasoline which comprises contacting the naphtha in the presence of added hydrogen and under hydroforming conditions of temperature and pressure with a catalyst consisting essentially of the reaction product of substantially equimolar proportions of molybdenum oxide, zinc oxide and magnesium oxide, supported on a preponderantly alumina base.

2. A process according to claim 1 wherein said alumina base contains a minor proportion of silica.

References Cited in the file of this patent
UNITED STATES PATENTS

| | | |
|---|---|---|
| 2,410,890 | Mason | Nov. 12, 1946 |
| 2,508,014 | Davidson | May 16, 1950 |
| 2,608,534 | Fleck | Aug. 26, 1952 |
| 2,632,739 | Dinwiddie et al. | Mar. 24, 1953 |
| 2,692,293 | Heinemann | Oct. 19, 1954 |